Feb. 14, 1967 K. PFLEIDERER 3,303,887
HELICOPTER ROTOR CONSTRUCTION
Filed Jan. 18, 1965 3 Sheets-Sheet 1

INVENTOR
Kurt Pfleiderer
By McGlew & Toren
ATTORNEYS

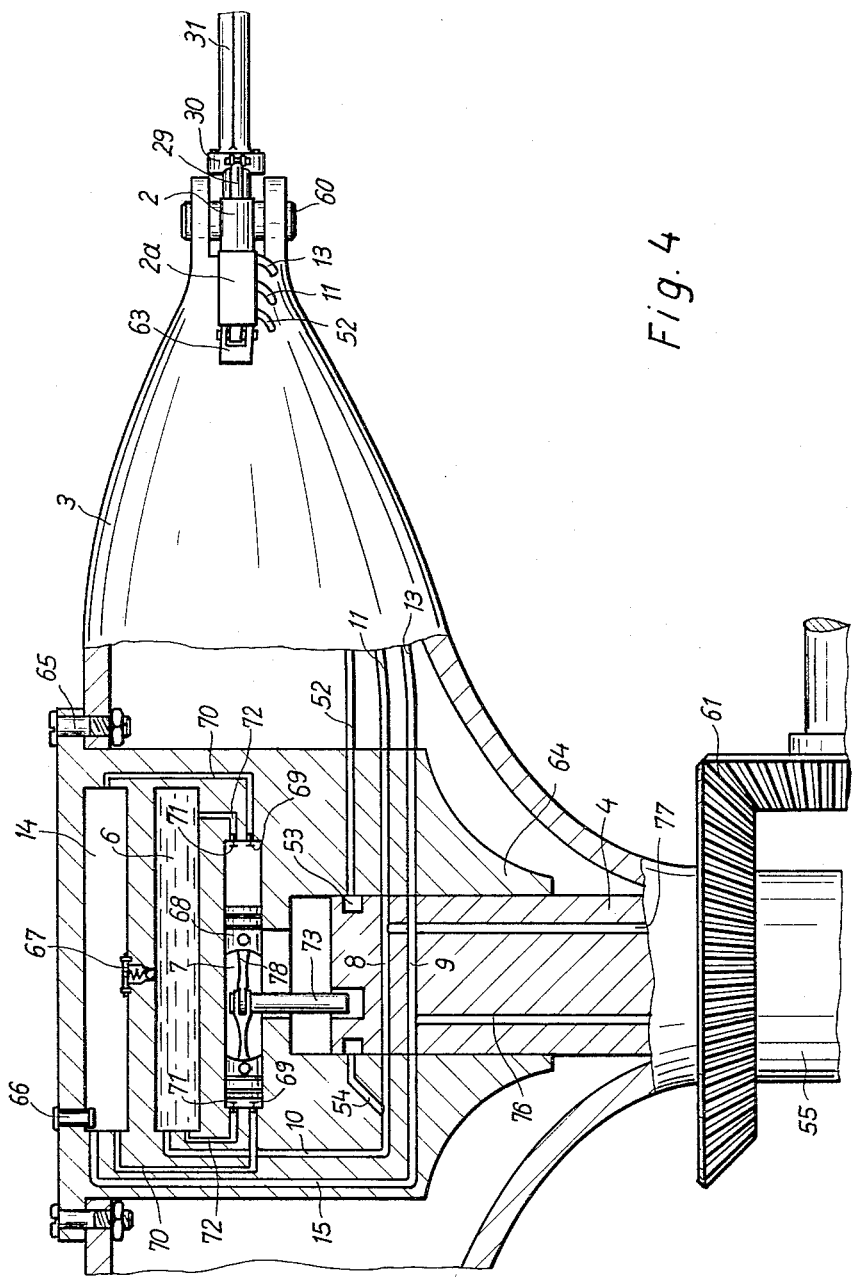

3,303,887
HELICOPTER ROTOR CONSTRUCTION
Kurt Pfleiderer, Munich, Germany, assignor to Bölkow Gesellschaft mit beschränkter Haftung, Ottobrunn, near Munich, Germany
Filed Jan. 18, 1965, Ser. No. 426,148
Claims priority, application Germany, Jan. 16, 1964, B 75,015
6 Claims. (Cl. 170—160.25)

This invention relates in general to the construction of rotary wing aircraft and to a method of moving the rotor blades thereof, and in particular to a rotary wing aircraft or helicopter in which the rotor blades are mounted for pivotal movement about an axis substantially parallel to the rotor axis so that their overall movement in the plane of rotation is in resonance with the axis of rotation of the rotor.

In helicopters a uniform approach flow of air over the rotor blades during the full revolution of the rotor should be provided in order to achieve a high speed in forward flight. Upon rotation of the rotor the blades which are being moved toward the front of the aircraft in respect to the direction of flight (0°) will encounter different approach flows than the blades which are moved toward the trailing end or rear of the aircraft (180° of rotor rotation). This difference in approach flow between the forward and trailing rotor blades can be balanced by the production of a different blade speed for the forward blades and the trailing blades. The difference in blade speed may be accomplished by imparting to the blades moving through the forward range a reduced rate of rotation about their lead-lag axes and by imparting an increase of speed of revolution during the overall rotation of the rotor. It has been found that it is necessary that the rotor blades are given a lead movement by the greatest amount at the beginning of the revolution cycle of the rotor, i.e., 0° (compared to the normal radial position of the blades at such rotor position). The blades are made to lag by the greatest angular amount when the rotor for the particular blade is rotated to an angle of 180°, while at 90° and 270°, respectively, the blades are held in a position in which they extend radially outwardly from the rotor for a normal position.

Rotor blades which are articulated for pivotal movement about a lead-lag axis parallel to the rotor axis can thus be moved to perform pivotal movements so that they will advantageously vibrate or move in resonance with the rotor shaft. A disadvantage in mounting the blades for free pivotal movement is that their phase position is established and that the air forces acting on the rotor blades effect displacement of the phase position or dampen the pivotal movement to such an extent that they come to a standstill. The result is that freely vibrating rotor blades cannot maintain the phase position of the pivotal movements necessary for uniform approach flow without having suitable control or guidance. In order to eliminate these disadvantages, forced guidance of the blades has been suggested, for example, such as by using rigid transmission means connected to the rotor shaft for the pivotal movement of the rotor blades. For this purpose various forms of wobble plates have been employed to superimpose a forced pivotal lead-lag movement on the blades as they are rotated with the rotor head. The movements which are imparted to the blades are obtained from the positioning of the wobble plate and forced upon the rotor blade by lever transmissions and push rods. It has been found with such an arrangement that in order to maintain the construction within justifiable limits from a cost standpoint, it is possible to tune the movement of the blades to the course of a free vibration movement, but constant intersections appear between the resonant vibrations of the blades and the forced form of vibration resulting in so called differential forces. Since such differential forces are already relatively great, even with minor deviations between the free and forced pivotal movements, the levers in the linkages as well as the respective parts of the rotor heads, must be dimensioned correspondingly. This leads, on the one hand, to unfavorable distribution of the driving forces through the driving elements. In addition, such drives produce residual movements about the axes of rotation of rotor blades.

In another known expedient it has been suggested to enforce the pivotal movement of the blades about their lead-lag axes through push rods and a fixed eccentric pin secured to the fuselage. However, since the course of the free pivotal movement of the blades can be simulated even to a lesser extent than with a wobble plate construction, the differential forces appearing are correspondingly greater so that the same disadvantages exist.

In accordance with the invention, there is provided a rotor having a plurality of blades which are pivotally mounted for movement about a lead-lag axis spaced from the axis of the rotor and in which variations in the energy-potential acting on the rotor blade during a pivotal cycle are compensated by a driving device acting on the rotor and effecting an intermittent influence on the pivotal movement in such a way that the energy potential remains constant during a revolution of the blade. The invention includes a hydraulic control system which is operated by rotation of the rotor to provide a pivotal lead-lag movement of the blades to correspond to the natural vibrational movement thereof in the manner of a free swinging centrifugal pendulum. The means for accomplishing this is of relatively simple construction and light weight and does not include the disadvantages of the prior art constructions. The invention provides a fluid system for balancing the variations in the energy potential of the various rotor blades which appear in the course of a rotational cycle of the rotor head. The hydraulic system includes means for effecting an intermittent action on the pivotal movement of the blades in such a way that the energy potential remains constant during a revolution of the blade. A principal advantage of the invention is that a forced guidance of each rotor blade extending over the full pivotal cycle is not necessary. Consequently, differential forces no longer appear so that a much lighter and more compact construction of the rotor head is possible.

In a preferred arrangement the driving system for pivoting the rotor blades about their lead-lag axes includes means for pivoting the blades at least once around 90° and again around 270° of angular rotation of the rotor head. Such an arrangement has the advantage that the rotor blades are influenced in the range of their maximum speed of rotation so that their free pivotal movement is least hindered.

In accordance with another feature of the invention a maximum influence on the movement of the rotor blades is imparted at approximately 90° and 270° of rotor head movement in respect to the particular blade, requiring a minimum of expenditure of energy for acceleration. The invention, of course, is not limited to forcing a lead-lag movement on the blades only at 90° and again at 270° but also intermittent influence can be effected in other angular ranges of rotation of the rotor, particularly when the required pivotal movement is not maintained due to external interfering influences. A feature of the construction is that the means for pivoting movement helps the starting condition of the pivotal movement of the rotor blades which must be started from their 0 position, i.e., at which the blades extend substantially radially in respect to the rotor axis. The same advantage also applies in respect to the stopping of the pivotal movement.

The inventive construction advantageously includes a fluid pressure system arranged to supply fluid pressure to an actuating cylinder having a piston movable therein for moving each blade about its lead-lag axis. The arrangement is such that the rotor provides a rotary valve element for supplying fluid pressure to the actuating cylinder for displacing the actuating piston in a desirable manner during rotation of the rotor. The actuation means may comprise any type of servo motor, such as a hydraulic, electrical or pneumatic type.

Accordingly, an object of the invention is to provide a method of pivoting the blades of a helicopter in a leading and lagging manner in the plane of rotation as the rotor carrying the blades is rotated.

It is a further object of the invention to provide a rotor construction having blades which are pivotal about individual, lead-lag axes substantially parallel to but spaced from the axis of the rotor and with means for forcing pivotal movement on the blades in a manner to secure optimum blade movement and without setting up additional forces which will disturb such optimum movement.

A further object of the invention is to provide means for superimposing a lead-lag pivotal movement on the blades of the rotor during rotation of the rotor by impulses which are directed to the blade only at predetermined angular positions of rotation of the rotor head.

A further object of the invention is to provide a fluid pressure system which is operable in timed relation to the rotation of the rotor of a rotary wing aircraft to direct energy impulses to means for moving each of the rotor blades about its pivotal lead-lag axis defined at a spaced location from the rotor axis in order to obtain optimum blade movement.

A further object of the invention is to provide a rotary wing aircraft which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

In the drawings:

FIG. 4 is a partial view of a rotor hub equipped with a control device according to the invention for influencing the lead-lag movement of the rotor blades.

Figure 1:
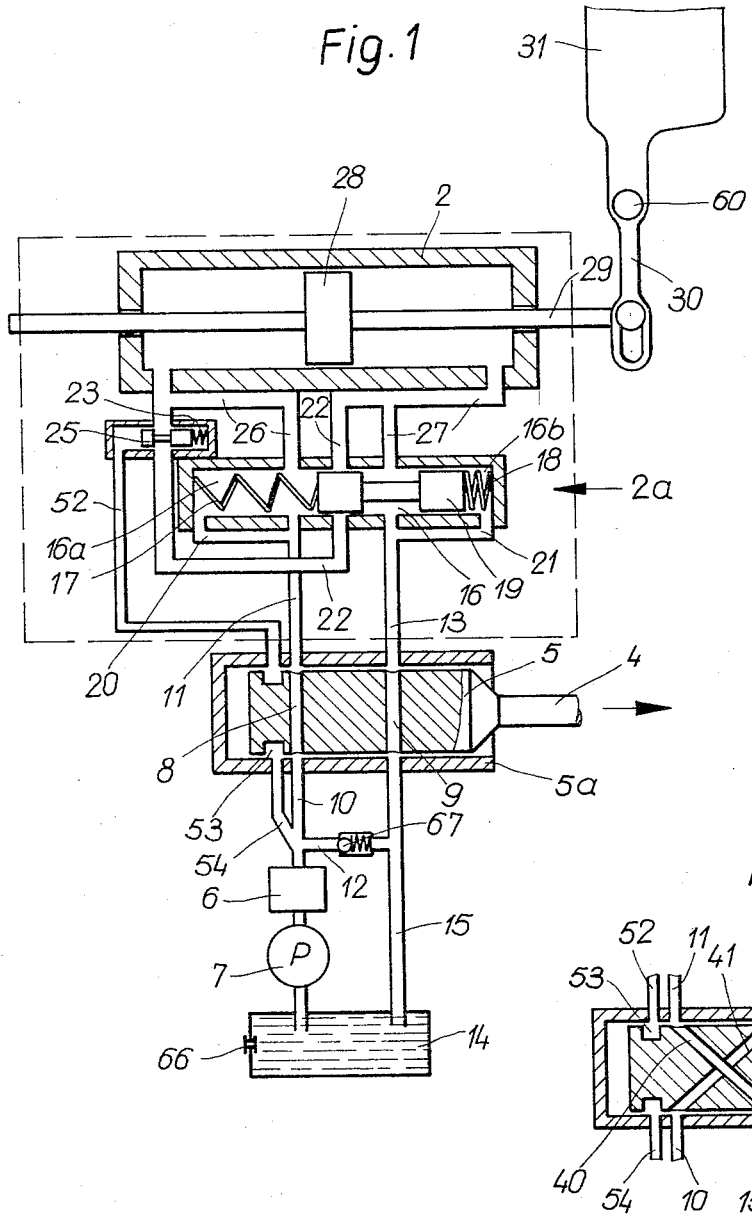
FIG. 1 is a schematic representation of a hydraulic control device according to the invention for producing an intermittent influence on the lead-lag movement of the rotor blades according to a rotor position of $\psi=90°$.
Figure 3:
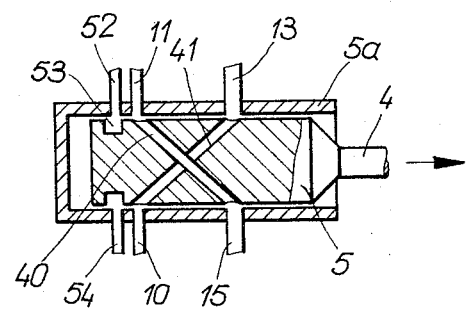
FIG. 3 is a sectional view of the rotary slide valve indicated in FIGS. 1 and 2 in a position, however, which is turned by 180° with respect to the position indicated in FIG. 1.
Figure 2:
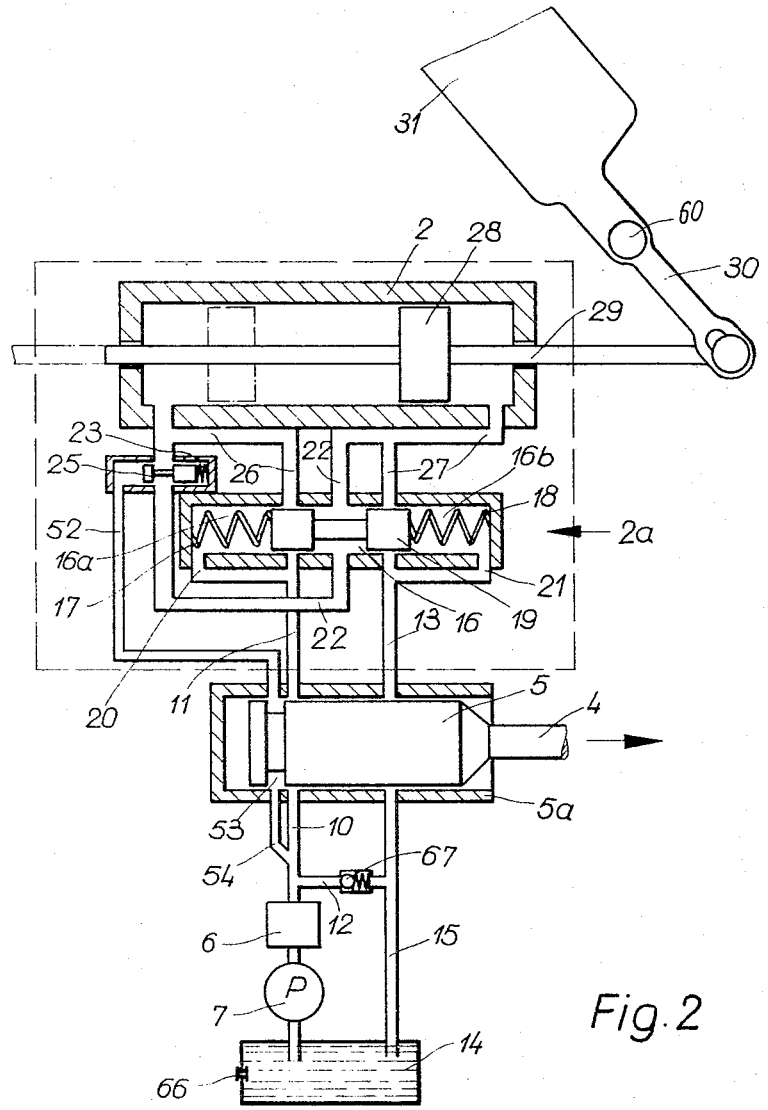
FIG. 2 is a view of the hydraulic control device according to FIG. 1 for a rotor position of $\psi=180°$.

The hydraulic servo motor, which is shown schematically in the dotted field 1 of FIGS. 1 and 2, essentially comprises a double-acting hydraulic cylinder 2 and a distributing slide valve 2a fitted to said hydraulic cylinder 2 as well as the oil-pressure supply of the servo motor, said oil-pressure supply mainly consisting of an oil pump 7, which continuously works against a pressure reservoir 6, and a rotary slide-valve portion 5a. This hydraulic servo motor rotates together with the rotor hub 3 (FIG. 4), while the rotary slide-valve portion 5 is stationary with respect to the rotor hub 3.

The action of the hydraulic cylinder 2 and of its distributing slide valve 2a is sub-divided into four phases during one lead-lag period and one rotation of the rotor, respectively, i.e. at an angle of rotation of $\psi=90°$ (phase I) and at an angle of rotation of $\psi=270°$ (phase III) a thrust force of a duration of $\psi=$about 5° shall be produced, while a movement without any resistance of the piston 28 and thus of the rotor blade 31 of a duration of $\psi=$about 175° shall be reached in the intermediary angular sections (phases II and IV).

The idle motion in phases II and IV is controlled by the distributing slide valve 2a which is connected to the hydraulic cylinder 2. Said distributing slide valve mainly consists of a double piston 19, which is movably fitted in a chamber 16 between two springs 17, 18 of equal force, the control lines 20, 21, the short-circuit line 22, which connects the lines 26, 27 with each other directly before entering the hydraulic cylinder 2, as well as the throttling valve 25, which is movably fitted against the force of a spring 23 in the short-circuit line 22.

In position $\psi=90°$ (phase I) the bore 8 of the stationary rotary slide-valve portion 5 connects the line 10 from pressure reservoir 6 with a line 11 to the distributing slide valve 2a of the hydraulic cylinder 2. At the same time a bore 9 in the stationary rotary slide-valve portion 5 forms a connection between the return pipe 13 from the distributing slide valve 2a of the hydraulic cylinder 2 and the line 15 to the oil sump 14. In this way pressure oil is simultaneously fed to the control line 20 branching off from the line 11 containing pressure oil as well as to the portion 16a of the chamber 16. Owing to the overpressure arising in the chamber portion 16a the double piston 19 is now displaced to the right (FIG. 1) against the force of the spring 18 so that, on the one hand, connections are formed between the line 11 and a line 26 leading from the chamber 16 to the hydraulic cylinder 2 as well as between the line 13 and the line 27 leading to the hydraulic cylinder, too; while, on the other hand, the short-circuit line 22 through the chamber 16 is blocked. The hydraulic piston 28 is now moved by the pressure arising on its back side, when seen in the direction of movement, and hence an impulse is given to the rotor blade 31 through the piston rod 29 and through the lever 30. The hydraulic oil thus displaced on the front side of the hydraulic piston 28 flows back into the oil sump 14 through the line 27, the chamber 16 and the line 13, the bore 9 of the rotary slide-valve portion 5 and the line 15.

After phase I of the rotation of the rotor was passed through, the rotary slide-valve portion 5 is so far shifted with respect to the rotary slide-valve portion 5a and thus with respect to the lines 10/11 and 13/15 at the beginning of phase II that there does not remain any connection between them. Thus the oil pressure existing in the line 11 and therewith in the control line 20 as well as in the chamber portion 16a breaks down so that the double piston 19 is returned to its central position by the springs 17, 18 which are balanced against each other. In this central position the piston frees the short-circuit line 22, on the one hand, while it interrupts the connection between the lines 11, 26 and 13, 27, on the other hand. In this position the cylinder portions of the hydraulic cylinder 2 on both sides of the hydraulic piston 28 are now connected with each other through the short-circuit line 22 so that the hydraulic piston 28 can now move nearly without any resistance in cylinder 2. In that case the mouths of the lines 26, 27 in the hydraulic cylinder can be arranged in such a way that there result arbitrarily determinable hydraulical stops for the hydraulic piston 28 within the range of the front sides of the hydraulic cylinder. During phase II the lines 10 and 15 are short-circuited by a relief-pressure valve 67 fitted in the connecting line 12 so that an overpressure, which might arise in the pressure reservoir 6 due to the closing of the lines 10 and 15 by the rotary slide-valve portion 5, is removed by pressure oil flowing off into the oil sump 14.

After phase II of the rotation of the rotor was completed, the rotary slide-valve portion 5a, which rotates with the rotor hub, is further shifted with respect to the non-rotatably mounted rotary slide-valve portion 5 at the beginning of phase III so that the pressure line 10 is now connected with the line 13 through the bore 41 and the line 11 is connected with the line 15 through the bore 40. Owing to this connection pressure oil is now fed through the line 13 to the control line 21 branching off from said line 13 and to the portion 16b of the chamber 16.

Owing to the overpressure arising in the chamber portion 16b the double piston 19 is displaced to the left against the action of the spring 17 so that, on the one hand, connections are formed between the lines 11/26 and the lines 13/27, while, on the other hand, the short-circuit line 22 is blocked. Then the hydraulic piston 28 is moved by the pressure arising on its back side, when seen in the direction of movement, and hence another impulse is given to the rotor blade 31 through the piston rod 29 and through the lever 30. Since, however, in phase III the pressure oil is admitted to the control slide-valve 2a in the opposite direction as compared to phase II, the impulse also acts in the opposite direction on the rotor blade.

After phase III of the angular range of the rotation of the rotor was passed through, the connections between the lines 10/13 and 11/15 are interrupted again by further shifting the rotary slide-valve portion 5a, and hence, due to the break-down of the pressure in the control slide-valve 2a, there occurs that condition with respect to the free movement of the piston 28 which had already been described in connection with phase II.

Differing from this stationary operating condition the lead-lag movements are started by gradually accelerating the rotor blades from their zero position. This effect is achieved by means of the above-described hydraulic cylinder by slowly opening the pressure-oil passage through the rotary slide-valve 5, 5a and by simultaneously and gradually admitting pressure oil to the throttling valve 25 through a line 52. For this purpose the stationary portion 5 of the rotary slide-valve is so mounted in the rotary slide-valve portion 5a that it can be moved axially. This axial displacement can be achieved by the pilot by means of a device which is not shown in the drawing. An axial displacement of the rotary slide-valve portion 5 in the direction of the arrow has the effect that the bores 8/9 and 40/41, respectively, coincide with the line 10/11 and 13/15 during the rotational cycle and that an annular channel 53 supplying pressure oil to the line 52 is connected to the oil pressure supply through the line connection 54. Therefrom results, on the one hand, that during phases I and III of the rotation of the rotor only small quantities of pressure oil are at first supplied through lines 11 and 13, respectively, of the distributing slide valve 2a and thus to the hydraulic cylinder 2 and that the thrust forces achieved are small, too; and that, on the other hand, the throttling valve 25 is only slightly moved in an opening direction against the action of the spring 23 by the line 52 and that damping forces act on the hydraulic piston 28 in phases II and IV which is due to the reduced cross-section of the short-circuit line 22, said damping forces preventing an undesired displacement of the motion amplitude during the start. The more the bores arranged in the rotary slide-valve portion 5 and the annular channel 53, respectively, coincide with the respective line connections in the rotating portion 5a of the rotary slide-valve the more increase the thrust forces steadily during phases I and III, while the damping forces in phases II and IV diminish more and more until stationary operating condition is finally achieved.

Just as in starting the braking of the lead-lag movements represents a deviation from the stationary operating condition. By gradually displacing the rotary slide-valve portion 5 against the direction of the arrow the coincidences of the bores 8/9 and 10/41, respectively, with the connections of the associated lines as well as with the line connection 54 with the annular channel 53 diminish more and more so that the influences on the lead-lag movements exerted during phases I and III decrease, and at the same time the throttling valve 25 is closed by the spring 23 due to the pressure drop in the line 52. This results in throttling of the short-circuit line 22 so that a corresponding damping force acts on the hydraulic piston 28 during phases II and IV. This damping force attains its maximum value when the rotary slide-valve portion 5 is displaced so far that any passage of pressure oil is prevented.

FIG. 4 shows a rotor hub 3 the rotor blades 31 of which are mounted for free lead-lag movement in a horizontal plane about the bolts 60 which are parallel to the rotor shaft 55. The rotor hub is driven in a known way by means of a bevel gearing 61 through a driving device not shown in detail. The hydraulic cylinder 2 acts on the rotor blade 31 through a short lever 30 and is held on the rotor hub by the abutment 63. The hydraulic lines 11/13 form the connection between the rotary slide-valve portion 5 and the distributing slide valve 2a of the hydraulic cylinder 2. The housing 64 is rigidly connected to the rotor hub 3 in a suitable way, e.g. by bolts 65. The housing 64 contains the oil sump 4, the pressure reservoir 6, and a double-acting piston pump 7. The oil sump 14 is ventilated by a valve 65, while the pressure reservoir 6 is secured by the relief pressure valve 67.

The pistons 68 of the pump 7 suck hydraulic oil from the oil sump 14 through the lines 70 which are closed by the check valves 69 and feed said oil during the return strokes of the pistons through the lines 72 into the presusre reservoir 7, said lines 72 being also provided with check valves 71. The pistons 68 are articulated by means of a connecting rod 78 to a crankpin 73 arranged eccentrically on the upper front side of the fixed shaft 4. The shaft 4 is provided with the bores 8/9 in the range adjoining the connections of the lines 11/13 and 10/15, respectively. The arrangement of the bore shown corresponds to the position at an angle of $\psi = 90°$. The annular channel 53 corresponds on the one hand to the line connection 54 and on the other hand to the oil-pressure line 52.

The shaft 4 is also provided with hydraulic lines 76/77 which are connected to the hydraulic system of the airplane to insure that there will always be an oil-pressure supply in the case of failure of the oil-pressure supply from the pressure reservoir 6 and thus insure the operating capacity of the servo motor.

The invention is not limited to the embodiment described herein, but instead of a hydraulic arrangement there may also be employed as equivalent arrangement with the same advantage, e.g. electric or pneumatic servo motors for producing thrust.

What is claimed is:

1. A rotary wing aircraft comprising a rotatable rotor, means for rotating said rotor, a plurality of blades pivotally mounted on said rotor at individually circumferentially spaced locations around the periphery of said rotor for pivotal movement about lead-lag axes substantially parallel to the axis of rotation of said rotor for pivotal lead-lag movement of the blades in the plane of rotation, means carried by said rotor and operated in timed relation to rotation thereof to selectively pivot said blades about their lead-lag axes as they are rotated with said rotor, said means being effective only at predetermined positions of the rotor to impart a forced pivotal movement of said blades only at times and in amounts to maintain a constant energy potential acting on said blades, said means being effective when the affected blade is moved around 90° from the forward position and again around 270° from the forward position of the blade, said means being effective to both initiate the rotative lead-lag movement and to stop the lead-lag movement and comprising pump means carried by said rotor and actuated thereby to produce a fluid pressure, an actuating element for pivoting each of said blades, a pressure reservoir, said pump being arranged to discharge to said pressure reservoir, and slide valve control means operated by rotation of said rotor and connected to said pressure reservoir and said actuating element for moving said actuating element and shifting said rotor blades at definite intervals during rotation of said rotor.

2. A rotary wing aircraft comprising a rotatable rotor, means for rotating said rotor, a plurality of blades pivotally mounted on said rotor at individually circumferentially spaced locations around the periphery of said rotor for pivotal movement about lead-lag axes substantially parallel to the axis of rotation of said rotor for pivotal lead-lag movement of the blades in the plane of rotation, means carried by said rotor and operated in timed relation to rotation thereof to selectively pivot said blades about their lead-lag axes as they are rotated with said rotor, including pump means carried by said rotor and connected to said rotor for actuation by rotation thereof, an actuating cylinder carried by said rotor for each blade, a piston slidable in said actuating cylinder, and slide valve control means connected between said pump means and said actuating cylinder for supplying fluid under pressure to said actuating cylinder for displacing the piston therein to move said blades at predetermined locations of rotation of said rotor head and for relieving said actuating cylinder of pressure for free pivotal movement of said blades at other predetermined locations of rotation of said rotor head.

3. A rotary wing aircraft comprising a rotatable rotor, means for rotating said rotor, a plurality of blades pivotally mounted on said rotor at individually circumferentially spaced locations around the periphery of said rotor for pivotal movement about lead-lag axes substantially parallel to the axis of rotation of said rotor for pivotal lead-lag movement of the blades in the plane of rotation, and means carried by said rotor and operated in timed relation to rotation thereof to selectively pivot said blades about their lead-lag axes as they are rotated with said rotor, including a pump carried by said rotor and actuated by rotation thereof, an actuating cylinder carried by said rotor for each blade, a piston slidable in said actuating cylinder and slide valve control means connected between said pump means and said actuating cylinder for displacing the piston therein to move said blades at predetermined locations of rotation of said rotor head, said slide valve means permitting the piston in said actuating cylinder to be moved freely at predetermined positions of said rotor head and including a fixed member having a fluid passage therein alignable with a connecting fluid passage in a member carried by said rotor.

4. A rotary wing aircraft comprising a rotatable rotor, means for rotating said rotor, a plurality of blades pivotally mounted on said rotor at individually circumferentially spaced locations around the periphery of said rotor for pivotal movement about lead-lag axes substantially parallel to the axis of rotation of said rotor for pivotal lead-lag movement of the blades in the plane of rotation, and means carried by said rotor and operated in timed relation to rotation thereof to selectively pivot said blades about their lead-lag axes as they are rotated with said rotor, said means being effective only at predetermined positions of the rotor to impart a forced rotation only at times and in amounts to maintain a constant energy potential acting on said blades, including a pump cylinder carried by said rotor, a pump piston slidable in said pump cylinder, means connected between said pump piston and said rotor to reciprocate said piston upon rotation of said rotor, an actuating cylinder carried by said rotor for each blade, a piston slidable in said actuating cylinder, and slide valve control means connected between said pump cylinder and said actuating cylinder for supplying fluid under pressure to said actuating cylinder for displacing the piston therein to move said blades at predetermined locations of rotation of said rotor head, said slide valve means permitting the piston in said actuating cylinder to be moved freely at predetermined positions of said rotor head.

5. A rotary wing aircraft comprising a rotatable rotor, means for rotating said rotor, a plurality of blades pivotally mounted on said rotor at individually circumferentially spaced locations around the periphery of said rotor for pivotal movement about lead-lag axes substantially parallel to the axis of rotation of said rotor for pivotal lead-lag movement of the blades in the plane of rotation, and means carried by said rotor and operated in timed relation to rotation thereof to selectively pivot said blades about their lead-lag axes as they are rotated with said rotor, said means being effective only at predetermined positions of the rotor to impart a forced rotation only at times and in amounts to maintain a constant energy potential acting on said blades, including pump means carried by said rotor, an actuating cylinder carried by said rotor for each blade, a piston slidable in said actuating cylinder and slide valve control means connected between said pump means and said actuating cylinder for supplying fluid under pressure to said actuating cylinder for displacing the piston therein to move said blades at predetermined locations of rotation of said rotor head, said slide valve means including means for diverting fluid pressure from said actuating cylinder permitting the piston in said actuating cylinder to be moved freely at predetermined positions of said rotor head.

6. A rotary wing aircraft comprising a rotatable rotor, means for rotating said rotor, a plurality of blades pivotally mounted on said rotor at individually circumferentially spaced locations around the periphery of said rotor for pivotal movement about lead-lag axes substantially parallel to the axis of rotation of said rotor for pivotal lead-lag movement of the blades in the plane of rotation, including pump means carried by said rotor, an actuating cylinder carried by said rotor for each blade, a piston slidable in said actuating cylinder, and slide valve control means connected between said pump means and said actuating cylinder for supplying fluid under pressure to said actuating cylinder for displacing the piston therein to move said blades at predetermined locations of rotation of said rotor head, said slide valve means permitting the piston in said actuating cylinder to be moved freely at predetermined positions of said rotor head.

References Cited by the Examiner
UNITED STATES PATENTS

| | | | |
|---|---|---|---|
| 2,919,081 | 12/1959 | Schon | 170—160.25 X |
| 3,050,276 | 8/1962 | Wissinger. | |
| 3,204,701 | 9/1965 | Muller et al. | 170—160.25 |

MARTIN P. SCHWADRON, *Primary Examiner.*

EVERETTE A. POWELL, Jr., *Examiner.*